United States Patent [19]

Jasmin et al.

[11] 4,300,208

[45] Nov. 10, 1981

[54] CONTROLLING WHICH OF TWO ADDRESSES IS USED BY A MICROCODE MEMORY

[75] Inventors: James L. Jasmin, White Bear Lake, Minn.; Lawrence M. Kruger, Clifton Park, N.Y.

[73] Assignee: Control Data Corporation, Minneapolis, Minn.

[21] Appl. No.: 98,993

[22] Filed: Nov. 30, 1979

[51] Int. Cl.³ .............................................. G06F 9/22
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,938,100 | 2/1976 | Steiner | 364/200 |
| 4,079,451 | 3/1978 | Woods et al. | 364/200 |
| 4,095,278 | 6/1978 | Kihara | 364/900 |

Primary Examiner—Raulfe B. Zache
Attorney, Agent, or Firm—William J. McGinnis, Jr.; Joseph A. Genovese

[57] ABSTRACT

A microcode addressing system is shown which has two modes of operation for different memory search functions. The first mode, the Slow mode in which the memory operates at a standard read rate, is the mode in which the computer central processing unit performs predetermined sequential tasks in a normal fashion. The second mode of operation is the Fast mode of operation in which the memory responds to unpredetermined, dynamically changing events in the computer system at a faster than standard cycle time in order to search for and identify a particular word in central memory.

9 Claims, 1 Drawing Figure

4,300,208

CONTROLLING WHICH OF TWO ADDRESSES IS USED BY A MICROCODE MEMORY

CROSS REFERENCE TO RELATED PATENT APPLICATIONS

This application is related to application Ser. No. 77,954, entitled PLURAL MICROCODE CONTROL MEMORY and application Ser. No. 77,955, entitled NETWORK FOR GENERATING MODIFIED MICROCODE ADDRESSES, both filed on Sept. 24, 1979 and both owned by the same assignee as the present application. The inventor in the two referenced applications is a co-inventor in the present application.

BACKGROUND OF THE INVENTION

This invention relates to microcode control memory search hardware for central processing units of computers.

In particular, this invention relates to an improvement in memory search operation as applied to a space table search function, which is required in virtual addressing systems, as shown in U.S. Pat. No. 3,938,100, owned by the same assignee as the present application.

U.S. Pat. No. 4,079,451 shows an indirect addressing system in which the addressing function is responsive to a logic means to select one of two separate modes of operation or to modify the addresses selected. It is believed, however, that this patent does not anticipate the present invention in which the memory has a Fast mode of operation to perform one function and a Slow mode of operation to perform another. However, the present invention does require an appropriate means to select which one of the two possible modes of operation is to occur.

SUMMARY OF THE INVENTION

The present invention shows a microcode control memory addressing system in which a central memory search function occurs in a Fast mode of operation and conventional microcode memory addressing occurs in a Slow mode of operation. The Slow mode operates in a conventional fashion with addresses in the address register fetching microcode control words from the microcode memory to the output register. Slow mode is so designated only to differentiate from the faster running Fast mode and not to describe or limit the conventional memory mode in any way. In the Fast mode of operation in which a central memory search is conducted, the object is to find and extract a certain central memory word, at least a portion of which compares with a specific predetermined value assigned in advance by the central processor of the computer system. In Fast mode, the central memory data words are examined to look for the specific matched portion of the source word provided by the central processing unit. More specifically, a word table in central memory is examined which is a subset of the entire central memory. The word table has a fixed starting address and a variable length adjusted by the operating system. A compare and decode network in the microcode memory control memory system controls the start, search and stop functions in Fast mode.

IN THE SINGLE DRAWING FIGURE

The single drawing FIGURE shows a block functional diagram of a microcode control memory for a central processing unit according to the present invention.

DESCRIPTION OF THE PREFERRED EMBODIMENTS

Figure 2:
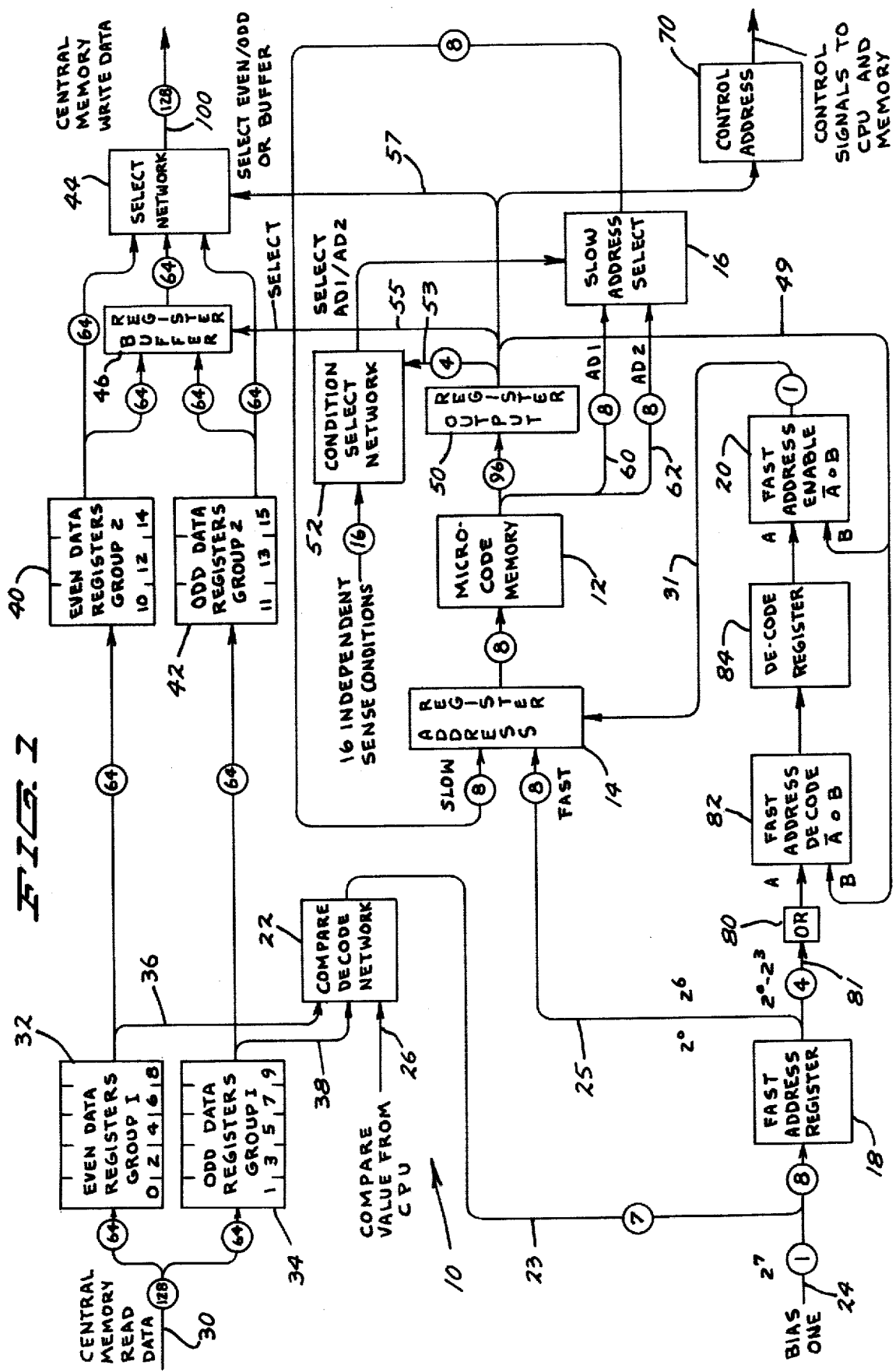

Referring now to the single drawing FIGURE, an embodiment 10 of the present invention is shown. A microcode memory 12 performs the functions of the control memory in a central processing unit. This is distinct from the function of a data memory which stores, reads and writes external data. The control memory of a central processor responds to input instructions to generate the necessary control signal instructions used to control the various operating elements of a central processing unit.

The microcode memory 12 receives input addresses from an address register 14. Address register 14 has two separate sources of inputs. The first input for Slow address functioning is from the Slow address select network 16. The second input for Fast address functioning is provided from the Fast address register 18 on bus 25. Address register 14 receives control signals to determine which of the two inputs addresses should be selected for getting to microcode memory 12 from a Fast address enable network 20.

The Fast address register 18 receives input address signals from a compare decode network 22 on bus 23 and a bias signal 24 as will be explained later. The compare decode network 22 has three inputs. The first input is the compare value on a compare value input bus 26 from the central processing unit. The other two inputs are the data register inputs with which the compare decode network 22 compares values from the compare value input bus 26. The present invention is shown in an embodiment, which for illustrative purposes only, has central data memory organized to provide data to odd and even register groups rather than a single data register group. This exact scheme is not critical to the present invention but merely shows a source of operands to the compare decode network 22.

In particular, a data memory read bus 30 contains a stream of data flowing from the central data memory of the contemplated computer system. This data is provided in the form of very large data words, which for illustrative purposes, is being shown as 128 bits long. Part of each such word consists of an odd data word and the other part consists of an even data word. Thus, the portion of each data word belonging in an even data register is provided to an even data register group 32 while the odd data word portions are provided through an odd data register group 34. These data register groups thus provide through an even data bus 36 and an odd data bus 38 an input to the compare decode network 22. Meanwhile, data is also provided to further portions, respectively, of even data register group 40 and odd data register group 42. Even data register group 40 has its output conveyed to both a select network 44 and to a buffer register 46. Similarly, odd data register group 42 has its output connected with select network 44 and with buffer register 46.

Microcode control memory 12 provides its output to an output register 50, as well as additional bits to the Slow address select network 16. The Slow address select network 16 also receives an input from the condition sense network 52. Condition sense network 52 receives as an input 16 independent sense conditions from the central processing unit of the computer, as well as certain bits from the output at output register 50.

Condition sense network 52 then provides a control condition to the Slow address select network to select whether the input on bus 60 or the bus 62 from the microcode memory is to be used as the output. The output of the Slow address select network is connected as previously described to address register 14. Further, control bits from output register 50 controls select network 44 to determine whether or not the output from the odd data register group 42 or even data register group 40 or the buffer register 46 should be used as the output. Finally, output bits from output register 50 control network 70 which provides control signals to the central processor and the data memory system of the computer.

The Fast address register 18 provides an output which is connected by bus 81 to an OR gate 80 which provides an address implementing function. The output of OR gate 80 is connected to a Fast address decode network 82 as a first input. The second input to Fast address decode network 82 is received as certain bits from the output register 50 on bus 49. In the present embodiment of the invention, only one bit from register 50 is used, but several bits could be used. In fact, the FAST address decode could be any logical function of A and B, but for the present embodiment an OR gate and an AND gate are used. The Fast address decode network 82 provides an output to decode register 84, the operation of which will be explained. The output of decode register 84 is in turn connected to the Fast address enable network 20 as the first of two inputs. The second input to the Fast address enable network 20 is received from the output register 50 on bus 49. This input from bus 49 is the same as the second input to network 82. The Fast address enable network 20 provides a single bit output to control address register 14 for the microcode memory 12.

Operation of the present invention will now be explained. The purpose of this dual mode addressing technique is to utilize the simplicity and flexibility of a microcode control memory without sacrificing the required speed of response to critical central processor events or the full read/write memory data rates.

Referring now to the first mode of operation of the microcode addressing hardware shown in FIG. 1, the Slow mode will now be described. In the Slow mode of addressing, addresses in the address register 14 fetch microcode control words from the microcode memory 12 which are then provided to the output register 50. The output register 50 sends various bit fields to the control network 70 which generates the proper signals required by the central processing unit, the central data memory, and certan miscellaneous internal hardware which may be required in some computer systems. The microcode addresses provided to register 14 may, for example, be 8 bit addresses. In the Slow mode of addressing, the microcode system responds to external and internal sense conditions which are provided as an input to the condition sense network 52. In the present example, it is assumed that 16 independent sense conditions may be provided and analyzed. These sense conditions can direct the microcode memory system of the present invention to provide for certain central processing unit memory references and perform certain predetermined, sequential tasks. The Slow mode address is clocked into the address register 14 from the Slow address select network 16 after it is selected from two possible control fields as provided on buses 60 and 62.

A 4 bit control field is provided on an output bus from output register 50 to condition sense network 52 on bus 53 and controls which of the predetermined sense conditions is selected through the condition sense network 52 to the Slow address select network 16. The Slow address select network 16 selects the address on bus 60 if the condition is present in the condition sense network 52. The address on bus 62 is selected if the predetermined condition is not present.

Referring now to FIG. 1, the Slow mode of operation provides for a situation where the current slow address contained in the address register 14 fetches a control word from the microcode memory 12 which supplies two possible addresses for the next control word. As the fetched control word is clocked into the output register 50, the selected Slow address for the next control word is clocked into the Slow address input of register 14. If the next control word does not depend on a sensed condition, but is part of a predetermined sequence of address operations, then, no condition is sensed in condition sense network 52 and bus 62 provides the next Slow address from the Slow address select network 16 to the address register 14. The portions of microcode memory 12 output words corresponding to buses 60 and 62 may be any desired microcode memory address value. This means that conditional or direct jumps may be accomplished by the microcode system and there is no need for address incrementing hardware.

Referring now to the FIGURE, the Fast addressing mode will be described. Output register 50 provides control fields to the buffer register 46 through a bus 55. These control fields provided on bus 55 together with control fields provided on bus 57 to the output select network 44 must respond to non-predetermined, dynamically changing events determined by the central memory words entering and passing through registers 32, 34, 40 and 42 at the same rate as the central processing unit clockcycle time. These events are detected by the compare decode network 22. The purpose of the memory search function performed in the Fast addressing mode is to provide for the location and extraction of a certain memory word, a portion of which compares with a specific value selected in advance by the central processing unit. During the memory search, hardware control must also examine each central data memory word for specific usage codes contained in each word. A certain code will terminate or stop the search, while another may cause that word to be extracted from the data stream and to be exchanged later on for the compare word, if found.

The compare decode network 22 translates the compare and decode information into, for example in the present embodiment, 7 non-predetermined, dynamically changing events which describe all the pertinent information needed about memory data words that reach rank 5 of the first group of even/odd data registers 32 and 36, respectively. These 7 events become the lower significant bits conducted on bus 23 to the Fast address register 18 and which then may be conducted on bus 25 to form the Fast address input to address register 14. At the time the data words which formed the Fast address which has been conducted on bus 25 to register 14 are clocked into the last rank of the group 2 even/odd registers 40 and 42, respectively, the Fast control word is clocked into the output register 50. Thus, the bit fields conducted on bus 55 to the buffer register 46 and on bus 57 to the select network 44 from the output register 50 will direct the data words to the proper half of the memory write data port 100 or to the buffer register 46. The buffer register 46 may be used to extract the desired words in the data stream, or, in conjunction with the select network 44, shift the list of data words forward in sequence for a portion or all of the data stream. This means that the data will be replaced in memory pushed forward by one memory address from the original address. The significant feature of the control scheme at the write data portion of the present invention comprising registers 40 and 42, buffer register 46, select network 44, and the control signals on buses 55 and 57 is that a different arrangement of data words may be transmitted to the data memory every clock period based on the status of the original data word pairs as they are encountered, in order, from central data memory.

In operation, the system of the present invention begins a search operation in the Slow mode and establishes the repetitive pattern of central memory requests and addressing. This causes the data stream to flow from central memory into data bus 30 into the even/odd data registers 32 and 34, respectively.

Operation proceeds with the arrival and shifting of read data through the even/odd data registers 32 and 34 until the first two data words reach rank 5 of these data registers. At this time, the system goes into the Fast mode of operation as a result of the setting of the Fast mode bit in output register 50 which is conveyed on bus 49 to the Fast address decode network 82 and the Fast address enable 20. The setting of this bit coincides with the first translated Fast address being clocked into the Fast address register 18 and the first two data words being clocked into the first rank of the even/odd data registers 40 and 42, respectively. On the next clock cycle, the Fast address is clocked into the microcode address register 14 and the first data words are clocked into the second rank of the second group data registers 40 and 42, respectively. The Fast address will then cause the microcode control memory 12 to fetch the first Fast control word from memory. On the following clock cycle this word will then be clocked into the output register 50. This is also the same time at which the first two data words are clocked into the last rank of the second group of even/odd data registers 40 and 42, respectively. As every pair of data words reaches the last rank of the even/odd data registers 40 and 42, respectively, a new Fast control word will be at the output register 50 to control what then occurs to these words. This process continues until the microcode exits the Fast mode of operation.

As previously mentioned, the seven non-predetermined, dynamically changing events which form the Fast address become the lower seven significant bits on bus 23 which are conducted to the Fast address register 18 with the most significant bit of register 18 continuously biased to be a one bit as shown on bias bus 24. By biasing this bit to a one, the address register 14 will automatically reference a portion of microcode memory reserved for Fast control words, such as highest numbered address one-half of the memory. Events which terminate the Fast mode search are arranged in the address so that if any one of the four lowest significant bits as conducted on bus 81 from register 18 is a one bit, that address when latched in the address register 14 will cause a reference to the last Fast control word. On the next clock cycle of operation, the microcode system will immediately exit Fast mode and reference a Slow mode control word. This system now resumes Slow mode of operation to perform normal sequential tasks needed for terminating the Fast search operation.

The exit from the Fast mode of operation is accomplished by the operation and combination of OR gate 80, the Fast address decode network 82, the decode register 84, and the Fast address enable circuit 20. As previously described, the microcode system enters the Fast mode of operation by setting the Fast mode bit on bus 49 from output register 50. This operation causes the Fast address enable network 20 to select the first Fast address into the address register 14. The Fast mode bit also enables the Fast address decode network 82 to determine if the Fast address to be loaded from the Fast address register 18 to the address register 14 is an address which will end the Fast mode of operation. This will cause a return to Slow mode. A simple OR gate 80 detects the fact that one or more of the lower 4 bits on bus 81 is a one and sets the decode register 84 at the same time the Fast mode exit address is provided on bus 25 to the address register 14. If the decode register 84 contains a 1, it will interrupt or break the Fast address enable network 20 and the Fast address select control signal to the address register 14 will switch the address register input to Slow addresses.

A significant advantage to the present invention is that the microcode system can jump into and out of Fast mode operation in a single cycle time. This means that the shift-extract manipulation of memory data can be performed on any size list of words, even a single word.

What is claimed is:

1. A microcode memory system for operating in at least a first mode or in a second mode of operation comprising:
   a microcode memory,
   a memory address register having its output connected to the microcode memory and having at least a first input and a second input, said register being responsive to an address select control signal to select which one of at least two possible inputs is connected with said microcode memory,
   a memory output register connected to said microcode memory,
   means for providing addresses for said first mode to said first input of said address register,
   first data register means connected to receive input data operands from a central processor, for providing at least a portion of said input data operands as an output,
   compare means connected to said first data register means for comparing said portions of input data operands with a predetermined value and providing an output address signal in response thereto,
   second mode address register means for receiving said output of said compare means and having as an output a signal which is connected with said second input of said memory address register, and
   second mode address control means for providing an address select control signal to said memory address register and receiving as input signals at least a portion of the contents of said memory output register and at least a portion of the contents of said second mode address register for controlling which of two preselected inputs to said address register comprises the address to said microcode control memory.

2. The system of claim 1 wherein said means for providing addresses for said first mode is a first mode address select network having an output connected to said first input of said address register and having as an input at least a portion of the output from said microcode memory.

3. The system of claim 2 wherein said first mode address select network has at least two inputs each of which consists of a distinct portion of the output of said microcode memory and further comprising a condition sense network which receives a plurality of predetermined sense conditions in said central processor and is responsive to a control signal constituting at least a portion of the output of said memory output register to select a predetermined combination of the predetermined sense conditions as a control signal to said address select network.

4. The system of claim 1 and further comprising a second data register means connected sequentially to receive the output of said first data register means, a data select network receiving the output of said second data register means as at least a first data input, and buffer register means receiving a data input from said second data register means and receiving as a control input at least a portion of the output of said memory output register and providing at least a second input to said select network said buffer register means being responsive to control signals selected from said portion of said memory output register to determine the selected output thereof.

5. A microcode memory system for operating in at least a first mode or in a second mode of operation comprising:

a microcode memory, memory address means having its output connected to the microcode memory and having at least two address inputs for responding to a control signal to select which one of said address inputs is connected with said microcode memory, a memory output register connected to said microcode memory, means for providing addresses for said first mode to an address input of said memory address means, first data register means, for providing at least a portion of input data operands as an output, compare means connected to said first data register means for comparing said portions of data operands with a predetermined value and providing an output address signal in response thereto, second mode address register means for receiving said output of said compare means and having as an output a signal which is connected with an address input on said memory address means, and second mode address control means for providing a select control signal to said memory address means and receiving as input signals at least a portion of the contents of said memory output register and at least a portion of the contents of said second mode address register means for controlling which of two preselected inputs to said address register comprises the address to said microcode control memory.

6. The system of claim 5 wherein said means for providing addresses for said first mode is a first mode address select network having an output connected to an input of said memory address means and having as an input at least a portion of the output from said microcode memory.

7. The system of claim 5 wherein said first mode address select network has at least two inputs each of which consists of a distinct portion of the output of said microcode memory and further comprising a condition sense network which receives a plurality of predetermined sense conditions in said central processor and is responsive to a control signal constituting at least a portion of the output of said memory output register to select a predetermined combination of the predetermined sense conditions as a control signal to said address select network.

8. The system of claim 5 and further comprising a second data register means connected sequentially to receive the output of said first data register means, a data select network receiving the output of said second data register means as at least a first data input, and buffer register means receiving a data input from said second data register means and receiving as a control input at least a portion of the output of said memory output register and providing at least a second input to said select network said buffer register means being responsive to control signals selected from said portion of said memory output register to determine the selected output thereof.

9. The apparatus of any of claims 5, 6, 7 or 8 in which said second mode address control means is comprised of second mode address decode means for receiving an input from said second mode address register means and producing an output control signal, decode register means for storing said output from said second mode address decode means, and second mode address enable means for controlling said memory address means in response to the signal in said decode register means and in response to a signal from said memory output register.

* * * * *